(12) United States Patent
Ma et al.

(10) Patent No.: US 6,965,705 B1
(45) Date of Patent: Nov. 15, 2005

(54) METHOD AND SYSTEM FOR DYNAMIC ANGLE INTERPOLATION IN IMAGE PROCESSING

(75) Inventors: Yue Ma, San Jose, CA (US); Hongmin Zhang, Santa Clara, CA (US)

(73) Assignee: nDSP, Inc., Campbell, CA (US)

( * ) Notice: Subject to any disclaimer, the term of this patent is extended or adjusted under 35 U.S.C. 154(b) by 659 days.

(21) Appl. No.: 09/925,195

(22) Filed: Aug. 9, 2001

(51) Int. Cl.[7] .............................. G06K 9/32; G06K 9/40
(52) U.S. Cl. ....................................... 382/300; 382/266
(58) Field of Search ................................ 382/299, 300, 382/266

(56) References Cited

U.S. PATENT DOCUMENTS

| | | | |
|---|---|---|---|
| 5,424,780 A | 6/1995 | Cooper | |
| 5,513,281 A * | 4/1996 | Yamashita et al. | 382/278 |
| 5,602,654 A * | 2/1997 | Patti et al. | 358/461 |
| 5,832,143 A * | 11/1998 | Suga et al. | 382/300 |
| 6,262,773 B1 * | 7/2001 | Westerman | 348/448 |
| 6,529,637 B1 | 3/2003 | Cooper | |

* cited by examiner

Primary Examiner—Amelia M. Au
Assistant Examiner—Wes Tucker
(74) Attorney, Agent, or Firm—Marger Johnson & McCollom

(57) ABSTRACT

A method and system for image resample by spatial interpolation. The method and system allow more than simple angle interpolation by allowing spatial interpolation to be performed on small angle edges. Multiple interpolation directions are established. Once an interpolation direction is selected, verifications are performed on the selected interpolation direction in order to rule out erroneous selection. If the selected interpolation direction passes all verification, then spatial interpolation will be performed along the selected interpolation direction. Otherwise, a default interpolation direction is used as the interpolation direction.

37 Claims, 3 Drawing Sheets

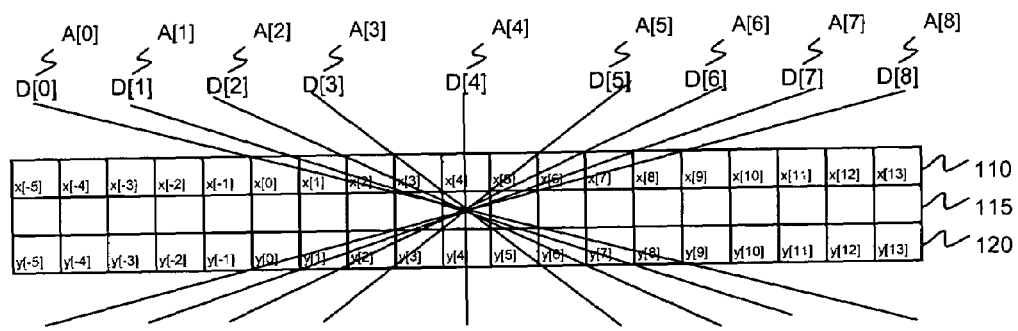
Figure 1A
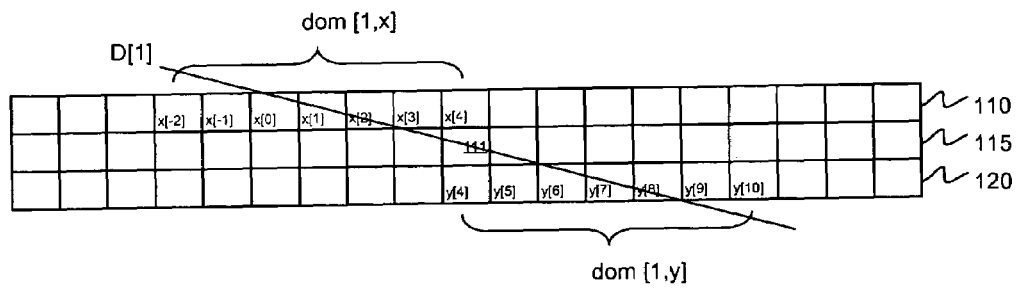
Figure 1B
Figure 1C

METHOD AND SYSTEM FOR DYNAMIC ANGLE INTERPOLATION IN IMAGE PROCESSING

FIELD OF THE INVENTION

The invention relates to image interpolation, particularly to using spatial interpolation to interpolate the re-sampled lines in an image, including motion pictures.

BACKGROUND

As television moves from an analog system to a digital system, several problems arise.

When the input image size and the display size are different, a resample processing which creates the pixel at a non-lattice position is needed. Also, in order to display interlaced video signals on a progressive display with high visual quality, it is necessary to 'de-interlace' interlaced odd and even fields of video signals into a sequentially continuous field of pixels without (inter-line) gaps.

Specifically, the most common method of implementing the interpolation function is to use a 2-line memory and generate the interpolated pixels from the pixel above (previous line) and the pixel below (next line). This implementation can be improved by using more lines to implement a higher order interpolation filter, giving slightly smoother images. However, those filters always operate on the basis that the current pixel is related to the pixel above and below it, which is completely untrue of edges with small angle. Whenever an edge is not vertical, the current pixel is related to those above and below it along the direction of the edge, e.g. if the angle is 45 degree the relationship is one up and one across and one down and one across. With small angle becomes more complex and will involve non-integer relationships. Moreover, currently prior art approaches only implement a simple angle interpolation; nothing is done on small angle edges.

BRIEF DESCRIPTION OF THE FIGURES

The accompanying drawings which are incorporated in and form a part of this specification, illustrate embodiments of the invention and together with the description, serve to explain the principles of the invention:

FIG. 1A shows an in portion of an image to be resampled accordance with one embodiment of the invention.

FIG. 1B shows possible interpolation directions established in the portion (shown in FIG. 1A) in accordance with the embodiment of FIG. 1A.

FIG. 1C shows pixel domains associated with a possible interpolation direction in accordance with the embodiment of FIG. 1A.

DETAILED DESCRIPTION

Figure 2:
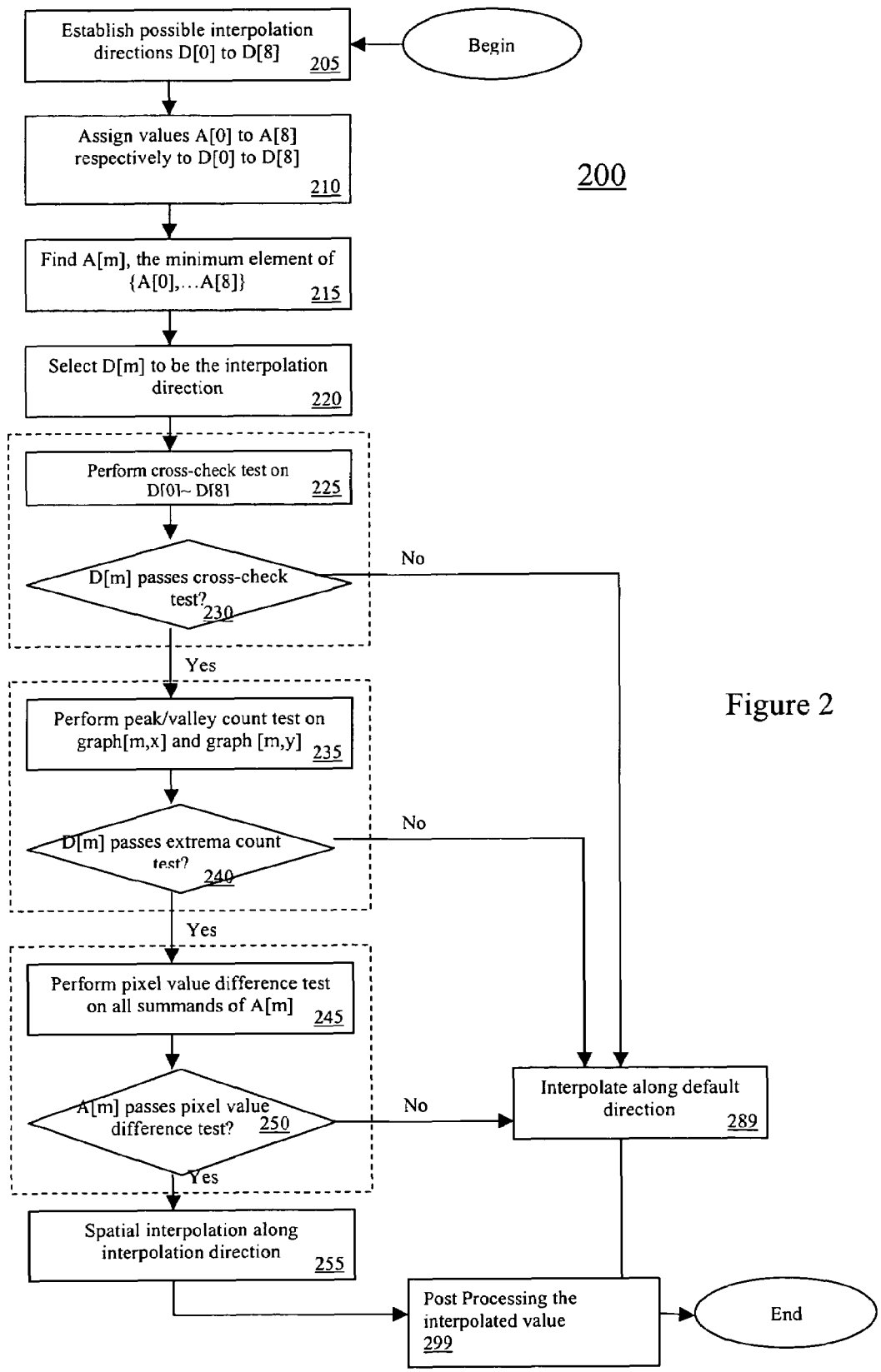
FIG. 2 is a flow chart outlining steps performed for interpolation in accordance with one embodiment of the invention.

Reference is made in detail to the preferred embodiments of the invention. While the invention is described in conjunction with the preferred embodiments, the invention is not intended to be limited by these preferred embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, as is obvious to one ordinarily skilled in the art, the invention may be practiced without these specific details. In other instances, well-known methods, procedures, components, and circuits have not been described in detail so that aspects of the invention will not be obscured.

Referring now to FIG. 1A, a portion of an image 100 that is to be resampled by spatial interpolation is shown in according to one embodiment of the invention. As shown, image 100 comprises lines 110 and 120 that are separated by a resampling line 115.

Resampling is performed on resampling line 115 of image 100. Specifically, line 110 comprises pixels x[−5] to x[13]; line 120 comprises pixels y[−5] to y[13]. Pixel x[4] is located immediately above a resampling pixel 111 (in resampling line 115); pixel y[4] is located immediately below resampling pixel 111.

In order to resample image 100, spatial interpolation is performed at the position of resampling pixel 111 to provide a pixel value to position 111. This spatial interpolation is performed along a direction that is selected from a set of possible interpolation directions (to be described in FIG. 1B) intercepting at position 111.

Referring now to FIG. 1B, interpolation directions D[1] to D[8] for performing spatial interpolation are shown in accordance with one embodiment of the invention. Spatial interpolation for position 111 can be performed along one of interpolation directions D[0] to D[8]. Directions D[0] to D[8] intercept effectively at the center of position 111, thereby forming various angles with respect to resampling line 115.

Specifically, as shown in FIG. 1B, direction D[0] is defined by a line effectively intercepting the centers of pixels x[0] and y[8]. Direction D[1] is defined by a line effectively intercepting the centers of pixels x[1] and y[7]. Direction D[2] is defined by a line effectively intercepting the centers of pixels x[2] and y[6]. Direction D[3] is defined by a line effectively intercepting the centers of pixels x[3] and y[5]. Direction D[4] is defined by a line effectively intercepting the centers of pixels x[4] and y[4]. Direction D[5] is defined by a line effectively intercepting the centers of pixels x[5] and y[3]. Direction D[6] is defined by a line effectively intercepting the centers of pixels x[6] and y[2]. Direction D[7] is defined by a line effectively intercepting the centers of pixels x[7] and y[1]. Direction D[8] is defined by a line effectively intercepting the centers of pixels x[8] and y[0].

Moreover, interpolation directions D[0] to D[8] can be classified into three different groups. Directions D[0] to D[3] belong to the group of directions having negative slopes. Direction D[4] belongs to the group of infinite slope (i.e., the vertical direction). Directions D[5] to D[8] belong to the group of directions having positive slopes.

Edge detection is performed along directions D[0] to D[8]. Once a possible edge is detected along a particular direction out of directions D[0] to D[8], such direction is selected to be the interpolation direction. Then, verifications are performed to make certain that indeed an edge is lying along the selected interpolation direction. In turn, once the selected interpolation direction is verified to contain an edge, spatial interpolation is performed using pixels lying along the selected interpolation direction. On the other hand, if the selected interpolation direction does not pass the verifications, it is disqualified as the interpolation direction. Instead, a default interpolation direction is used for performing spatial interpolation.

Referring still to FIG. 1B, numerical values A[0] to A[8] are assigned respectively to interpolation directions D[0] to D[8]. Then, based on A[0] to A[8], a selection method then selects a possible interpolation direction from directions D[0] to D[8]. Specifically, A[0] to A[8] quantify the likelihood of having an edge lying respectively along directions D[0] to D[8], wherein the more likely an edge lies along a direction, the smaller the numerical value assigned to that direction. As such, an interpolation direction is selected from directions D[0] to D[8] as the direction having the minimum numerical value.

As understood herein, the possible interpolation directions need not be limited to the nine directions D[0] to D[8] as shown here. For example, in another embodiment, additional directions can be defined intercepting position 111, wherein even smaller angles are formed between the additional directions and resampling line 115. On the other hand, in yet another embodiment of the invention, less number of directions can be defined intercepting position 111, wherein bigger angles are formed between the intercepting directions and resampling line 115.

In the present embodiment, for k=0 to 8, numerical value A[k] is defined as $$A[k]=\Sigma|P(x[i])-P(y[j])|,$$

i=k−4 to k+4, and j=8−k−4 to 8−k+4, wherein P is a function that assigns a pixel value to a pixel. Specifically, for k=0 to 8, A[k] quantifies the degree of similarity between two segments of pixels, wherein these two segments are symmetric about position 111. This pair of symmetric segments are seg[k,x]={x[k−4], x[k−3], . . . , x[k+4]} and seg[k,y]={y[8−k−4], . . . , y[8−k+4]}.

Using A[k=1] as an example, $$A[1]=\Sigma|(x[i])-P(y[j])|,$$

for i=−3 to 5, and for j=3 to 11. A[1] quantifies the similarity between two segments of pixels, wherein these two segments are symmetric about position 111. This pair of symmetric segments are seg[1,x]={x[−3], x[−2], . . . , x[−5]} and seg[1,y]={y[3], y[4], . . . , y[11]}.

As understood herein, a pixel value assigned by function P can refers to a gray-level value, a luminance value, a chrominance value, a composite signal value, or a combination of any channel of any image representation.

Referring now to FIG. 1C, two pixel domains (dom[1,x] and dom[1,y]) associated with interpolation direction D[1] is shown in accordance to one embodiment of the invention. Pixel domains dom[1,x] and dom[1,y] are used for respectively plotting graph[1,x] and graph[1,y] assigned to D[1]. Specifically, dom[1,x] includes pixels x[−2] to x[4] from line 110; dom[1,y] includes pixels y[4] to y[10] from line 120.

Although not shown in FIG. 1C, each of D[0], and D[2] to D[8] also has its associated pair of pixel domains. In turn, each of D[0] to D[8] has its associated pair of graphs that plot pixel values vs. pixel position. The number of pixels in these pixel domains can vary according to which of D[0] to D[8] is selected. Specifically, for k=0 to 8, D[k] is associated with pixel domains dom[k,x] and dom[k,y]. More specifically, for k=0 to 4, pixel domain dom[k,x] includes pixels x[k−(4−k)] to x[4], and pixel domain dom[k,y] includes pixels y[4] to y [(8−k)+(4−k)]. For k=4 to 8, pixel domain dom[k,x] includes pixels x[4] to x[(8−k)+(4−k)], and pixel domain dom[k,y] includes pixels y[k−(4−k)] to y [4]. In turn, graph[k,x] and graph[k,y] show pixel values plotted respectively against dom[k,x] and dom[k,y].

As an example, D[0] is associated with pixel domains dom[0,x] and dom [0,y]. Pixel domain dom[0,x] includes pixels x[−4] to x[4] and pixel domain dom[0,y] includes pixels y[4] to y [12]. In turn, graph[0,x] and graph[0,y] show pixel values plotted respectively against dom[0,x] and dom [0,y].

As another example, as the associated pixel domains for D[4], pixel domain dom[4,x] includes pixel x[4] and pixel domain dom[4,y] includes pixel y[4]. In turn, graph[4,x] and graph[4,y] show pixel values plotted respectively against dom[4,x] and dom[4,y].

As yet another example, as the associated pixel domain for D[6], pixel domain dom[6,x] includes pixels x[4] to x[8] and pixel domain dom[6,y] includes pixels y[0] to y[4]. In turn, graph[6,x] and graph[6,y] show pixel values plotted respectively against dom[6,x] and dom[6,y].

As will be described later with reference to FIGS. 2–3, once an interpolation direction (e.g., D[m]) has been selected, a peak/valley count test is performed using graph [m,x] and graph[m,y] associated with D[m]. Peak/valley test exemplifies one of possible tests in performing segment analysis on one or both of symmetric segment pair associated with D[m].

Specifically, the peak/valley count test is performed to count the number of peaks and valleys in graph[m,x], as well as the number of peaks and valleys in graph[m,y]. More than one peak or valley in either one of the two graphs indicates that an edge is not likely to be lying along direction D[m]. As such, according to the peak/valley count test, if more than one peak or valley is found in either graph[m,x] or graph [m,y], then D[m] is disqualified as the correct interpolation direction. Once D[m] is disqualified as such, spatial interpolation will not be performed along D[m], but rather along a default interpolation direction.

Referring now to FIG. 2 in view of FIGS. 1A–C, a flow chart 200 is shown outlining steps for performing spatial interpolation in accordance with one embodiment of the invention. The present embodiment allows spatial interpolation to be performed at various small angles that are not available in prior art approaches. Specifically, spatial interpolation for position 111 can be performed along one of interpolation directions D[0] to D[8]. Directions D[0] to D[8] form various angles with respect to resampling line 155.

Edge detection is performed along directions D[0] to D[8] using symmetric segment pair detection. Specifically, once a possible edge is detected along a particular direction out of directions D[0] to D[8], such direction is selected to be the interpolation direction. Then, using symmetric segment pairs analysis and segment analysis, verifications are performed to make certain that indeed an edge is lying along the selected interpolation direction. In turn, once the selected interpolation direction is verified to contain an edge, spatial interpolation is performed using pixels lying along the selected interpolation direction. On the other hand, if the selected interpolation direction does not pass the verifications, it is disqualified as the interpolation direction. Instead, a default interpolation direction is used for performing spatial interpolation. Finally, post processing can be performed on interpolated result to refine image quality.

Steps 205, 210, 215 and 220 are performed for symmetric segment pair detection.

In step 205, directions D[0] to D[8] are established using pixels x[0] to x[8] of line 110, and pixels y[0] to y[8] of line 120. D[0] to D[8] are possible directions along which to detect an edge intercepting position 111.

In step 210, numerical values A[0] to A[8] are assigned to D[0] to D[8]. A[0] to A[8] quantify the respective likelihoods of detecting an edge lying along D[0] to D[8]. The smaller a numerical value is assigned to a possible interpolation direction, the more likely an edge is lying along such interpolation direction.

In step 215, A[m], the minimum element of {A[0], . . . , A[8]}, is detected.

In step 220, D[m], the interpolation associated with A[m], is selected to be the direction most likely to detect an edge.

Steps 225 and 230 are performed for symmetric segment pairs analysis.

In step 225, a cross check test is performed. Performing such cross test can rule out the problematic scenario of interpolating at position 111 along D[m] while two edges cross each other at position 111. Specifically, the test is performed to rule out a scenario wherein A[h] of direction D[h] (whose slope has the opposite sign from the sign of the slope of D[m]) is slightly difference from A[m]. The cross check test is also performed to rule out a scenario wherein the vertical direction A[4] is slightly difference from A[m]. D[m] passes the cross check test if no problematic scenario is found.

As understood herein, for symmetric segment pairs analysis, an extreme value analysis can be performed in step 225 to replace the cross check test. For symmetric segment pairs analysis, the extreme value analysis can also be performed in step 225 in addition to the cross check test. The extreme value analysis is performed on the graph of A[t] for t varying continuously from 0 to 8. Specifically, the extreme value analysis is performed to detect any one of three cases. The first case is that A[m] is a minimum where m is not equal to 0 or 8, and the slope of graph of A[t] changes sign only once from negative to positive. The second case is that A[m] is a minimum where m is 0, and the sign of slope in graph of A[t] remains positive. The third case is that A[m] is a minimum where m is 8, and the sign of slope in the graph of A[t] remains negative. D[m] is disqualified if A[m] does not fit any one of the above three cases.

In query step 230, a check is performed to verify if D[m] passes the cross check test. If affirmative, then step 235 is performed. Otherwise, step 289 is performed to interpolate along a default direction.

Steps 235, 240, 245 and 250 are performed for segment analysis. As understood herein, segment analysis does not need to include all of these four steps. For example, in one embodiment of the invention, segment analysis comprises steps 235 and 240, but without steps 245 and 250. In yet another embodiment, segment analysis comprises 245 and 250, but without steps 235 and 240.

In step 235, a peak/valley count test is performed on two graphs of function P obtained by applying P over two domains of pixels, one domain from line 110 and one domain from line 120. The peak/valley count test is used to analyze the two pixel segments from symmetric segment pair associated with D[m].

A peak is defined as a point on a graph having a slope on the left side of the point, and a slope on the right side of the peak point. Specifically, the left slope and the right slope meet at the point. The left slope is positive and larger than a pre-defined threshold; the right slope is negative and smaller than a pre-defined threshold.

A valley is defined as a point on a graph having a slope on the left side of the point, and a slope on the right side of the valley point. Specifically, the left slope and the right slope meet at the point. The left slope is negative and smaller than a pre-defined threshold; the right slope is positive and larger than a pre-defined threshold.

Specifically, D[m] is assumed to be D[1] as an example. For D[m=1], function P is applied to pixels x[−2] to x[4] of dom[1,x] to obtain pixel values P(x[−2]) to P(x[4]), thereby resulting in a first graph, graph[1,x]. Additionally, function P is applied to pixels y[4] to y[10] of dom[1,y] to obtain pixel values P(y[4]) to P(y[10]), thereby resulting in a second graph, graph[1,y]. The peak/valley count test is performed to count the number of peaks and valleys in the first graph, as well as the number of peaks and valleys in the second graph.

D[1] passes the peak/valley count test if no more than one peak or valley is presented in graph[1,x] and if no more than one peak or valley is presented in graph[1,y]. Specifically, more than one peak or valley in either one of the two graphs indicates that an edge is not likely to be lying along direction D[m=1]. As such, if more than one peak or valley are found in graph[1,x], or if more than one peak or valley are found in graph[1,y], then D[m=1] fails the peak/valley count test. Spatial interpolation will not be performed along D[m=1] if D[m=1] does not pass the peak/valley count test.

To explain with another specific example, D[m] is assumed to be D[0]. Specifically, for the example of D[m=0], function P is applied to pixels x[−4] to x[4] to obtain pixel values P(x[−4]) to P(x[4]), thereby resulting in a first graph. Additionally, function P is applied to pixels y[4] to y[12] to obtain pixel values P(y[4]) to P(y[12]), thereby resulting in a second graph. The peak/valley count test is performed to count the number of peaks and valleys in the first graph, as well as the number of peaks and valleys in the second graph. More than one peak or valley in either one of the two graphs indicates that an edge is not likely to be lying along direction D[m=0]. As such, spatial interpolation will not be performed along D[m=0].

From the above two specific examples, domain[m,x] (from x[m−4] to x[4]) in line 110 and domain[m,y] (from y[4] to y[12−2m]) in line 120 vary according to m. That is, pixel domains for each interpolation direction are different.

Moreover, from the above two specific examples, the peak/valley count test can be described as follow. Specifically, for D[m] where m is selected from {0, 1, . . . , 8}, function P is applied to pixels of dom[m,x] (i.e., x[m−4] to x[4]) to obtain pixel values P(x[m−4]) to P(x[4]), thereby resulting in a first graph. Additionally, function P is applied to pixels of dom[m,y] (i.e., y[4] to y[12−2$m$]) to obtain pixel values P(y[4]) to P(y[12−2$m$]), thereby resulting in a second graph, graph[m,y]. The peak/valley count test is performed to count the number of peaks and valleys in the first graph graph[m,x], as well as the number of peaks and valleys in the second graph graph[m,y]. More than one peak or valley in either one of the two graphs indicates that an edge is not likely to be lying along direction D[m]. As such, spatial interpolation will not be performed along D[m].

In query step 240, a check is performed to see if D[m] passes the peak/valley count test. If affirmative, then step 245 is performed. Otherwise, step 289 is performed.

In step 245, a pixel value difference test is performed. Specifically, absolute pixel value differences (summands) that are used in obtaining A[m] are compared to a pre-defined threshold value T. For A[m], these absolute pixel value differences are the summands of A[m]:

|P(x[m−4])−P(y[m−4])|;
|P(x[m−3])−P(y[m−3])|;
|P(x[m−2])−P(y[m−2])|;
|P(x[m−1])−P(y[m−1])|;

|P(x[m])−P(y[m])|;
|P(x[m+1])−P(y[m+1])|;
|P(x[m+2])−P(y[m+2])|;
|P(x[m+3])−P(y[m+3])|; and
|P(x[m+4])−P(y[m+4])|.

Each of these summands represents the absolute pixel value difference between a pair of pixels, one from line 110 and one from line 120.

If at least one of these quantities exceeds T (pre-defined as a number between o to 255), then a single absolute difference between the pixel values of two pixels has already contributed more than T to A[m]. As such, noise rather than an edge is likely to be suggested by pixel values P(x[m−4]) to P(x[m+4]) and P(y[8−m−4]) to P(y[8−m+4]). Accordingly, D[m] fails the pixel value difference test if at least one of these quantities exceeds T.

In query step 250, a check is made to verify if D[m] passes the pixel value difference test. If affirmative, then step 255 is performed. Otherwise, step 289 is performed to replace the disqualified D[m] by a default interpolation direction.

In step 255, spatial interpolation at position 111 is performed along D[m].

In step 289, spatial interpolation at position 111 is performed along a default interpolation direction. In the present embodiment, the default interpolation direction intercepts effectively the center of position 111 to form a 45 degree angle with respect to resampling line 115. However, as understood herein, in another embodiment, a default interpolation direction intercepts effectively the center of position 111 to form a different angle with respect to resampling line 115.

In step 299, post processing is performed to refine the interpolated image. Specifically, the interpolated value at position 111 is analyzed with respect to the neighboring pixel values. Adjustment of the interpolated pixel value at position 111 is performed according to the result of this analysis.

As understood herein, the cross check test, the peak/valley count test and the pixel value difference test need not be performed in the order as outlined in flow chart 200. Rather, six different performing orders are possible for performing these three tests.

Figure 3:
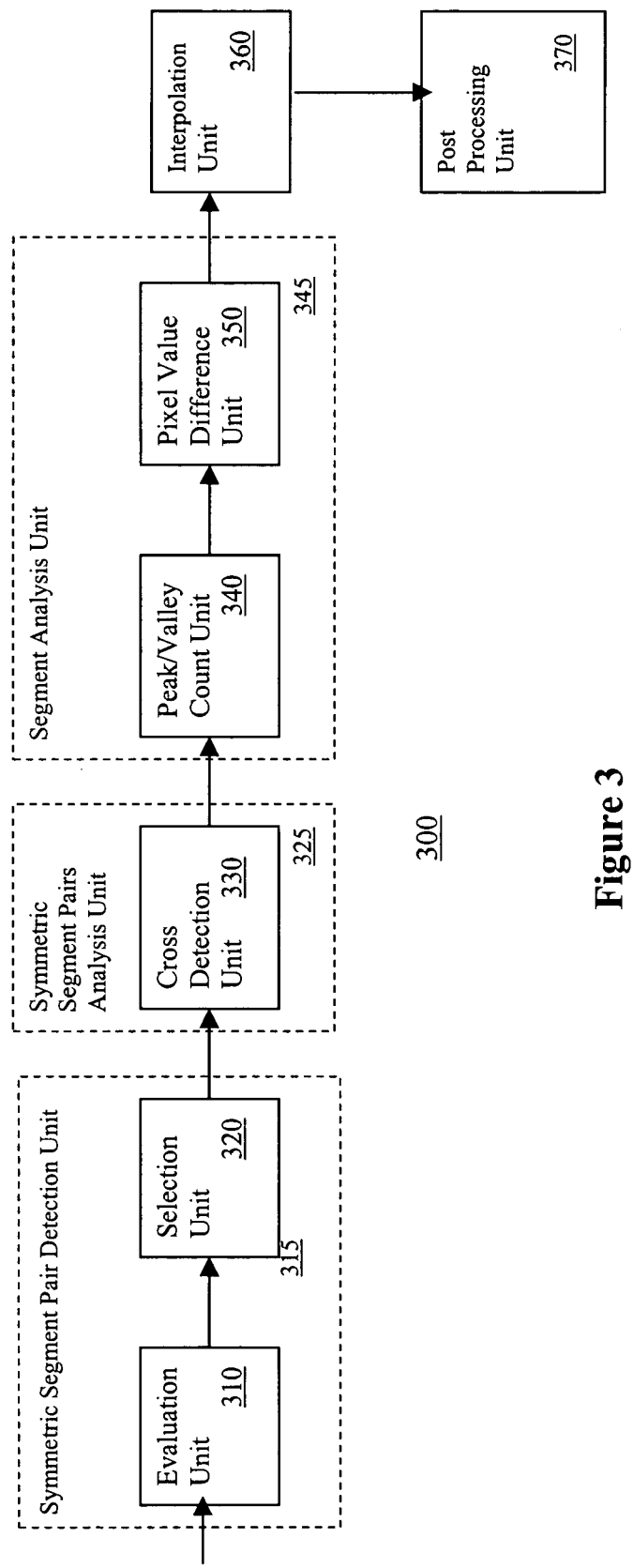
FIG. 3 depicts a system for performing spatial interpolation in accordance with one embodiment of the invention.

Referring now to FIG. 3 in view of FIGS. 1A–C, a system 300 for performing image spatial interpolation is shown in accordance with one embodiment of the invention. System 300 comprises an evaluation unit 310, a selection unit 320, a cross detection unit 330, a peak/valley count unit 340, a pixel value difference count unit 350, an interpolation unit 360 and a post-processing unit 370. Specifically, evaluation unit 310 and selection unit 320 are parts of a symmetric segment pair detection unit 315. Cross detection unit 330 is a part of symmetric segment pairs analysis unit 335. Peak/valley count unit 340 and pixel value difference unit 350 are parts of a segment analysis unit 345.

Symmetric segment pair detection unit 315 is coupled to symmetric segment pairs analysis unit 335. Symmetric segment pairs analysis unit 335 is coupled to segment analysis unit 345. Segment analysis unit 345 is coupled to interpolation unit 360. Interpolation unit 360 is coupled to post-processing unit 370. Specifically, evaluation unit 310 is coupled to selection unit 320, which is in turn coupled to cross detection unit 330. Cross detection unit 330 is coupled to peak/valley count unit 340 that is in turn coupled to pixel value difference unit 350. Pixel value difference unit 350 is coupled to interpolation unit 360.

Symmetric segment pair detection unit 315 is adapted to assign values to possible interpolation directions, wherein each interpolation direction is associated with a pair of pixel segments symmetric about position 111. Symmetric segment pair detection unit 315 is also adapted to detect and select an interpolation direction as the direction whose associated segment pair contains the two most similar pixel segments. In the present embodiment, symmetric segment pair detection unit 315 comprises evaluation unit 310 and selection unit 320.

Evaluation unit 310 is adapted receive pixel values of pixels in lines 110 and 120 to generate numbers A[0] to A[8] that are assigned respectively to possible interpolation directions D[0] to D[8]. For k=0 to 8, A[k] quantifies the similarity between two pixel segments that are symmetric about position 111.

Selection unit 320 is adapted to select an interpolation direction D[m] along which to perform spatial interpolation for position 111. Specifically, selection unit 320 is adapted to select such interpolation direction D[m] whose assigned value A[m] is the minimum element of {A[0], A[1], . . . , A[8]}. D[m] is then transmitted to cross detection unit 330 as a possible candidate for being the interpolation direction to be used by interpolation unit 360.

As understood herein, in the present embodiment, A[m] associated with the selected interpolation direction D [m] is the minimum among {A[0], A[1], . . . , A[8]}. However, depending on the definition of A[m] used, A[m] associated with selected interpolation direction D [m] need not be the minimum among {A[0], A[1], . . . , A[8]}. For example, in another embodiment wherein a different definition of A[k] is used for k=0 to 8, A[m] associated with selected interpolation direction D[m] is the maximum among {A[0], A[1], . . . , A[8]}.

Symmetric segment pairs analysis unit 335 is adapted to analyze all symmetric segment pairs associated respectively with D[0] to D[8]. Given the selected symmetric segment pair associated with D[m], symmetric segment pairs analysis unit 335 checks to see if any of the remaining symmetric segment pairs crosses the selected symmetric segment pair. In the present embodiment cross detection unit 330 is included in symmetric segment pairs analysis unit 335 to perform this cross check. However, in another embodiment, an extreme value analysis unit 333 can also be incorporated into symmetric segment pairs analysis unit 335. In yet another embodiment, extreme value 333 alone can be incorporated in segment pairs analysis unit 335.

Cross detection unit 330 is adapted to perform a cross check test on D[m]. By performing such cross test, cross detection unit 330 can rule out the problematic scenario of interpolating at position 111 along D[m] while two edges cross each other at position 111. Specifically, the test is performed by cross unit 330 to rule out a scenario wherein A[h] of direction D[h] (whose slope has the opposite sign from the sign of the slope of D[m]) is slightly difference from A[m]. The cross check test is also performed by cross detection unit 330 to rule out a scenario wherein the vertical direction A[4] is slightly different with A[m]. D[m] passes the cross check test if no problematic scenario is found. As such, if D[m] passes the cross check test, then D[m] is transmitted to peak/valley count unit 340 to undergo another test as a viable interpolation direction to be used by interpolation unit 360. Otherwise, a default interpolation is passed to peak/valley count unit 340 as the interpolation direction to be used by interpolation unit 360.

Extreme value analysis unit 333 is adapted to detect any one of three cases on the graph of A[t] as t varies continuously from 0 to 8. The first case is that A[m] is a minimum where m is not equal to 0 or 8, and the slope of A[k] changes sign only once from negative to positive. The second case is that A[m] is a minimum where m is 0, and the sign of slope in graph of A[k] remains positive. The third case is that A[m] is a minimum where m is 8, and the sign of slope in graph of A[k] remains negative. D[m] is disqualified if A[m] does not fit any one of the above three cases.

Segment analysis unit 345 is adapted to analyze the symmetric segment pair associated with D[m]. If any anomaly is found in the analysis, then D[m] is disqualified as a viable interpolation direction. In the present embodiment, segment analysis unit 345 comprises peak/valley count unit 340 and pixel value difference unit 350. Peak/valley count unit 340 can be considered as performing first order analysis on the symmetric segment pair associated with D[m]. Pixel difference count test unit 350 can be considered as performing zero-order analysis on the symmetric segment pair associated with D[m]. However, as understood herein, segment analysis unit 345 need not be limited as such. For example, in another embodiment of the invention, segment analysis unit 345 comprises pixel value difference unit 350, but does not include peak/valley count unit 340. In yet another embodiment of the invention, segment analysis unit 345 comprises peak/valley count unit 340, but does not include pixel value difference unit 350. In yet another embodiment of the invention, second or higher order of analysis is performed on the symmetric segment pair associated with D[m].

Peak/valley count unit 340 is adapted to perform an peak/valley count test on D[m]. Peak/valley count unit 340 performs the peak/valley count test on two graphs of function P obtained by applying P over two domains of pixels, one domain from line 110 and one domain from line 120.

A peak is defined as a point on a graph having a slope on the left side of the point, and a slope on the right side of the point. Specifically, the left slope and the right slope meet at the peak point. The left slope is positive and larger than a pre-defined threshold; the right slope is negative and smaller than a pre-defined threshold.

A valley is defined as a point on a graph having a slope on the left side of the point, and a slope on the right side of the point. Specifically, the left slope and the right slope meet at the valley point. The left slope is negative and smaller than a pre-defined threshold; the right slope is positive and larger than a pre-defined threshold.

Specifically, D[m] is assumed to be D[1] as an example. For D[m=1], function P is applied to pixels x[−2] to x[4] of dom[1,x] to obtain pixel values P(x[−2]) to P(x[4]), thereby resulting in a first graph, graph[1,x]. Additionally, function P is applied to pixels y[4] to y[10] of dom[1,y] to obtain pixel values P(y[4]) to P(y[10]), thereby resulting in a second graph, graph[1,y]. The peak/valley count test is performed by peak/valley count unit 340 to count the number of peaks and valleys in the first graph, as well as the number of peaks and valleys in the second graph.

D[1] passes the peak/valley count test if no more than one peak or valley is presented in graph[1,x] and if no more than one peak or valley is presented in graph[1,y]. Specifically, more than one peak or valley in either one of the two graphs indicates that an edge is not likely to be lying along direction D[m=1]. As such, if more than one peak or valley are found in graph[1,x], or if more than one peak or valley are found in graph[1,y], then D[m=1] fails the peak/valley count test. Spatial interpolation will not be performed along D[m=1] if D[m=1] does not pass the peak/valley count test.

To explain with another specific example, D[m] is assumed to be D[0]. Specifically, for the example of D[m=0], function P is applied to pixels x[−4] to x[4] to obtain pixel values P(x[−4]) to P(x[4]), thereby resulting in a first graph. Additionally, function P is applied to pixels y[4] to y[12] to obtain pixel values P(y[4]) to P(y[12]), thereby resulting in a second graph. The peak/valley count test is performed by peak/valley count unit 340 to count the number of peaks and valleys in the first graph, as well as to count the number of peaks and valleys in the second graph. More than one peak or valley in either one of the two graphs indicates that an edge is not likely to be lying along direction D[m=0]. As such, spatial interpolation will not be performed along D[m=0].

From the above two specific examples, domain[m,x] (from x[m−4] to x[4]) in line 110 and domain[m,y] (from y[4] to y[12−2m]) in line 120 vary according to m. That is, pixel domains for each interpolation direction are different.

Moreover, from the above two specific examples, the peak/valley count test can be described as follow. Specifically, for D[m] where m is selected from {0, 1, . . . , 8}, function P is applied to pixels of dom[m,x] (i.e., x[m−4] to x[4]) to obtain pixel values P(x[m−4]) to P(x[4]), thereby resulting in a first graph. Additionally, function P is applied to pixels of dom[m,y] (i.e., y[4] to y[12−2m]) to obtain pixel values P(y[4]) to P(y[12−2m]), thereby resulting in a second graph, graph[m,y]. The peak/valley count test is performed by peak/valley count unit 340 to count the number of peaks and valleys in the first graph graph[m,x], as well as the number of peaks and valleys in the second graph graph[m, y]. More than one peak or valley in either one of the two graphs indicates that an edge is not likely to be lying along direction D[m]. As such, spatial interpolation will not be performed along D[m].

Accordingly, if D[m] passes the peak/valley count test, then D[m] is transmitted to pixel value difference unit 350 to undergo yet another test as a viable interpolation direction to be used by interpolation unit 360. Otherwise, the default interpolation is passed to peak/valley count unit 340 as the interpolation direction to be used by interpolation unit 360.

Pixel value difference unit 350 is adapted to perform a pixel value difference test. Specifically, absolute pixel value differences used in obtaining A[m] are compared to a pre-defined threshold value T. For A[m], these absolute pixel value differences are the summands of A[m]:

|P(x[i])−P(y[j])|;
|P(x[i])−P(y[j])|;
P(x[i])−P(y[j])|;
|P(x[i])−P(y[j])|;
P(x[i])—P(y[j])|;
|P(x[i])−P(y[j])|;
P(x[i])−P(y[j])|;
|P(x[i])−P(y[j])|; and
|P(x[i])−P(y[j])|.

Each of these summands represents the pixel value difference between two pixels, one from line 110 and one from line 120. If at least one of these quantities exceeds T, then a single absolute difference between the pixel values of two pixels has already contributed more than T to A[m]. As such, noise rather than an edge is likely to be suggested by pixel values P(x[m−4]) to P(x[m+4]) and P(y[8−m−4]) to P(y[8−m+4]). Accordingly, D[m] fails the pixel value difference test if at least one of these quantities of A[m] exceeds T.

As such, if D[m] passes the pixel value difference test, then D[m] is transmitted by pixel value difference unit 350 to interpolation unit 360 as the interpolation direction to be used by interpolation unit 360. Otherwise, the default interpolation direction is transmitted to interpolation unit 360.

Interpolation unit 360 is adapted to perform spatial interpolation for position 111. This spatial interpolation is performed along D[m] if D[m] has not been rejected by cross detection unit 330, peak/valley count unit 340 or pixel value difference unit 350. Otherwise, this spatial interpolation is performed along the default direction.

Post processing unit 370 is adapted to perform refinement on the interpolated image. Post processing unit 370 analyzes the interpolated value at position 111 with respect to the neighboring pixel values. Adjustment of the interpolated pixel value at position 111 is performed according to the result of this analysis.

As understood herein, coupling order of cross check unit 330, peak/valley count test unit 340 and pixel value difference test unit 350 need not be limited to the coupling order as described above (cross check unit 330-peak/valley count test unit 340-pixel value difference test unit 350). At least five other coupling orders are possible. For example, in another embodiment, the coupling order of these units (330, 340 and 350) is pixel value difference test unit 350-cross check unit 330-peak/valley count test unit 340. That is, pixel value difference test unit 350 is coupled to cross check unit 330 that is in turn coupled to peak/valley count test unit 340.

In all of the embodiments described above (FIGS. 1B, 2–3), for k=0 to 8, A[k] is defined as proportional to the expectation of a random variable, namely function P. However, as understood herein, for k=0 to 8, A[k] need not be limited to the definition used above.

For example, in another embodiment, A[k] is defined as proportional to the variance of P. That is, for k=0 to 8, $A[k]=\Sigma|P(x[i])-P(y[j])|^2$, i=k−4 to k+4, and j=8−k−4 to 8−k+4. Using this definition, A[m] associated with the selected direction D[m] is the minimum element of {A[0], A[1], . . . , A[8]}.

As another example, in yet another embodiment, A[k] is defined as proportional to the cross correlation of P. That is, for k=0 to 8, $A[k]=\Sigma 1/(|P(x[i])*P(y[j])|)$, i=k−4 to k+4, and j=8−k−4 to 8−k+4. Using this definition, A[m] associated with the selected direction D[m] is the minimum element of {A[0], A[1], . . . , A[8]}.

More generally, for the purpose of expressing the degree of the two segments (of a symmetric segment pair) being similar, for k=0 to 8, A[k] need not be limited to the form of:

$A[k]=\Sigma_{r=-c \ to \ c} f(P(x[i]), P(y[j]))$, i=k−4 to k+4, and j=8−k−4 to 8−k+4. Rather, for k=0 to 8, A[k] can be defined more generally in the form of:

$A[k]=J(g(x[i]), g(y[j]))$, i=k−4 to k+4, and j=8−k−4 to 8−k+4, wherein functions J and g can be chosen in accordance with the application at hand.

For example, in the present embodiment, function g is simply function P acting on pixels belonging to the symmetric segment pair associated with D[k], for k=0 to 8. In a different embodiment of the invention, function g is the Fourier transform of P acting on pixels belonging to the symmetric segment pair associated with D[k], for k=0 to 8. In another embodiment of the invention, function g is the wavelet transform of P acting on pixels belonging to the symmetric segment pair associated with D[k], for k=0 to 8. In yet another embodiment of the invention for motion pictures, function g(x[i])=q(P(x[i]), motion_data(x[i])). That is, function g acting at a pixel is equal to a combination q of pixel value function P acting at the pixel and the motion data information at the pixel belonging to the symmetric segment pair associated with D[k], for k=0 to 8. As such, segment analysis in FIG. 2 and segment analysis unit 345 of FIG. 3 can be implemented using any of the above variations of function g.

Also as understood herein, in all embodiments of the invention, k need not be limited to the range from 0 to 8. For example, in another embodiment, k ranges from 0 to 2n where n is different from 4. Moreover, the parameters of A[k] need not be as defined in the above embodiments. For example, in an alternative embodiment, A[k] is defined using i=k−c to k+c, and j=8−k−c to 8−k+c, where c is different from 4.

Moreover, as understood herein, for k=1 to 2n, the number of pixels in graph[k,x] and the number of pixels in graph[k,y] need not be limited to that of the embodiments described above. Specifically, the numbers of pixels in graph[k,x] and graph[k,y] can be chosen to fit the application of the invention contemplated.

The foregoing descriptions of specific embodiments of the invention have been presented for purposes of illustration and description. They are not intended to be exhaustive or to limit the invention to the precise forms disclosed. Obviously, many modifications and variations are possible in light of the above teaching. The embodiments were chosen and described in order to explain the principles and the application of the invention, thereby enabling others skilled in the art to utilize the invention in its various embodiments and modifications according to the particular purpose contemplated. The scope of the invention is intended to be defined by the claims appended hereto and their equivalents.

What is claimed is:

1. For an image to be re-sampled, a method of performing spatial interpolation at a pixel position of a resampling line, said pixel position immediately below pixel x[0] of a first line comprising pixels x[−n] to x[n], said pixel position also immediately above pixel y[0] of a second line comprising y[−n] to y[n], said method comprising:

for k= to 2n, assigning a numerical value A[k] to a direction D[k] that is established as a possible interpolation direction intercepting x[−n+k],said pixel position, and y[n−k], wherein said A[k] is defined for indicating the likelihood of an edge crossing said pixel position along said D[k] by quantifying the degree of similarity between a pixel segment seg[k,x]={x[−n+k−c], . . . , x[−n+k+c]}from said first line and a pixel segment seg[k,y]={y[n−k−c], . . . , y[−n−k+c]} from said second line, said first and said second segments approximately symmetric about said pixel position;

selecting from D[0] to D[2n] a first direction D[m] whose assigned A[m] indicates the highest likelihood of an edge crossing said pixel position along said D[m];

performing a segment analysis on a symmetric segment pair seg[m,x] and seg[m,y] associated with D[m], said segment analysis adapted to verify said symmetric segment pair as belonging to an edge crossing said pixel position, said seg[m,x] and seg[m,y] symmetrically located with respect to said pixel position; and in response to said D[m] having been verified by said segment analysis, performing spatial interpolation at said pixel position along said D[m];

wherein for k=0 to 2n, said A[k]=Σ$_{r=-c\ to\ c}$f(P(x[−n+k+r]), P(y[n−k+r])); and wherein said function P is adapted to assign a pixel value to every pixel.

2. The method of claim 1, wherein for k=0 to 2n, said A[k]=Σ$_{r=-c\ to\ c}$|P(x[−n+k+r])−P(y[n−k+r])| is proportional to the expectation of said function P as a random variable function; and wherein said A[m] is the smallest element of {A[0], A[1], . . . A[2*n*]}.

3. The method of claim 1, wherein for k=0 to 2n, said A[k]=Σ$_{r=-c\ to\ c}$|P(x[−n+k+r])−P(y[n−k+r])|$^2$ is proportional to the variance of said function P as a random variable function; and wherein said A[m] is the smallest element of {A[0], A[1], . . . A[2*n*]}.

4. The method of claim 1, wherein for k=1 to 2n, said A[k]=Σ$_{r=-c\ to\ c}$(|P(x[−n+k+r]) *P(y[n−k+r])|) is proportional to the cross correlation of said function P as a random variable function; and wherein said A[m] is the smallest element of {A[0], A[1], . . . A[2*n*]}.

5. The method of claim 1, wherein said segment analysis comprises performing a pixel value difference test to verify that none of said 2c+1 summands {f(P(x[−n+m+r]), P(y−m+r]); r=−c to c} of A[m]) exceeds a pre-defined threshold value.

6. The method claim 1, wherein said segment analysis comprises performing a count test to verify that the total number of peaks and valleys in a graph graph[m,x] assigned to D[m] does not exceed 1, and that the total number of peaks and valleys in a graph graph[m,y] assigned to D[m] does not exceed 1; and wherein said graph [m,x] comprises {x[u], P(x[u]); for u=(−n+k)+(−n+k) to 0};

and wherein said graph[m,y] comprises {y[v], P(y[v]); for v=0 to (n−k)+(n−k)} and performing a pixel value difference test to verify that none of said 2c+1 summands {f(P(x[ −n+m+r]), P(y[n−m+r]); r=−c to c} of A[m] exceeds a pre-defined threshold value.

7. The method of claim 1, comprising in response to said D[m] having failed said segment analysis test, performing spatial interpolation at said pixel position along a default interpolation direction.

8. The method of claim 7, wherein said default interpolation direction intercepts said pixel position, thereby forming approximately a 45-degree angle at said resampling pixel.

9. The method of claim 1, comprising:

performing an extreme value analysis on graph A[t] as t varies from 0 to 2n to detect a first case wherein said A[m] is a minimum with m is not equal to 0 or 2n and the slope of A[t] changes sign only once from negative to positive; a second case wherein said A[m] is a minimum with m equals to 0 and the sign of slope of A[t] remains positive; or a third case wherein said A[m] is a minimum with m equals to 2n and the sign of slope of A[t] remains negative; and wherein D[m] is disqualified as an interpolation direction for said pixel position if none of said three cases is detected; and performing post processing by adjusting the interpolated value of said pixel position according to the interpolated value of said pixel position and the pixel values of pixels neighboring said pixel position.

10. For an image to be re-sampled, a method of performing spatial interpolation at a pixel position of a resampling line, said pixel position immediately below pixel x[0] of a first line comprising pixels x[−n] to x[n], said pixel position also immediately above pixel y[0] of a second line comprising y[−n] to y[n], said method comprising:

for k= to 2n, assigning a numerical value A[k] to a direction D[k] that is established as a possible interpolation direction intercepting x[−n+k],said pixel position, and y[n−k], wherein said A[k] is defined for indicating the likelihood of an edge crossing said pixel position along said D[k] by quantifying the degree of similarity between a pixel segment seg[k,x]={x [−n+k−c], . . . , x[−n+k+c]} from said first line and a pixel segment seg[k,y]={y[n−k−c], . . . , y[−n−k+c]} from said second line, said first and said second segments approximately symmetric about said pixel position;

selecting from D[0] to D[2*n*] a first direction D[m] whose assigned A[m] indicates the highest likelihood of an edge crossing said pixel position along said D[m];

performing a segment analysis on a symmetric segment pair seg[m,x] and seg[m,y] associated with D[m], said segment analysis adapted to verify said symmetric segment pair as belonging to an edge crossing said pixel position, said seg[m,x] and seg[m,y] symmetrically located with respect to said pixel position; and in response to said D[m] having been verified by said segment analysis, performing spatial interpolation at said pixel position along said D[m];

wherein for k=0 to 2n, said A[k]=J(g(x[i]), g(y[j])), I=−n+k−c to −n+k+c, and j=n−k−c to n−k+c; and wherein functions J and g can be chosen in accordance with the application at hand.

11. The method of claim 10, wherein said function g is the Fourier transform of P acting on pixels belonging to the symmetric segment pair seg[k,x] and seg[k,y] associated with D[k], for k=0 to 2n.

12. The method of claim 10, wherein said function g is the wavelet transform of P acting on pixels belonging to the symmetric segment pair seg[k,x] and seg[k,y] associated with D[k], for k=0 to 2n.

13. The method of claim 10, wherein for motion pictures, said function g(d[i])=q(P(x[i]), motion_data(x[i])) acting at a pixel x[i] is equal to a combination q of pixel value function P acting at said pixel x[i] and the motion data information at said pixel x[i] to the symmetric segment pair associated with D[k], for k=0 to 2n.

14. The method in any of claims 2–10, wherein said 2n=8, wherein said c=3, and wherein said pixel value assigned by P is luminance value.

15. For an image to be re-sampled, a method of performing spatial interpolation at a pixel position of a resampling line, said pixel position immediately below pixel x[0] of a first line comprising pixels x[−n] to x[n], said pixel position also immediately above pixel y[0] of a second line comprising y[−n] to y[n], said method comprising:

for k= to 2n, assigning a numerical value A[k] to a direction D[k] that is established as a possible interpolation direction intercepting x[−n+k],said pixel position, and y[n−k], wherein said A[k] is defined for indicating the likelihood of an edge crossing said pixel position along said D[k] by quantifying the degree of similarity between a pixel segment seg[k,x]={x [−n+k−c], . . . , x[−n+k+c]} from said first line and a pixel segment seg[k,y]={y[n−k−c], . . . , y[−n−k+c]} from said second line, said first and said second segments approximately symmetric about said pixel position;

selecting from D[0] to D[2n] a first direction D[m] whose assigned A[m] indicates the highest likelihood of an edge crossing said pixel position along said D[m];

performing a segment analysis on a symmetric segment pair seg[m,x] and seg[m,y] associated with D[m], said segment analysis adapted to verify said symmetric segment pair as belonging to an edge crossing said pixel position, said seg[m,x] and seg[m,y] symmetrically located with respect to said pixel position; and in response to said D[m] having been verified by said segment analysis, performing spatial interpolation at said pixel position along said D[m];

wherein said segment analysis comprises performing a peak/valley count test to that the total number of peaks and valleys in a graph graph[m,x] assigned to D[m] does not exceed 1, and that the total number of peaks and valleys in a graph graph[m,y] assigned to D[m] assigned to does not exceed 1; and wherein said graph[m,x] comprises {x[u], P(x[u]); for u=(−n+k)+(−n+k) to 0}, and wherein said graph [m,y] comprises {y[v], P(y[v]); for v=0 to (n−k)+(n−k)}.

16. For an image to be re-sampled, a method of performing spatial interpolation at a pixel position of a resampling line, said pixel position immediately below pixel x[0] of a first line comprising pixels x[−n] to x[n], said pixel position also immediately above pixel y[0] of a second line comprising y[−n] to y[n], said method comprising:

for k= to 2n, assigning a numerical value A[k] to a direction D[k] that is established as a possible interpolation direction intercepting x[−n+k],said pixel position, and y[n−k], wherein said A[k] is defined for indicating the likelihood of an edge crossing said pixel position along said D[k] by quantifying the degree of similarity between a pixel segment seg[k,x]={x[−n+k−c], ..., x[−n+k+c]} from said first line and a pixel segment seg[k,y]={y[n−k−c], ..., y[−n−k+c]} from said second line, said first and said second segments approximately symmetric about said pixel position;

selecting from D[0] to D[2n] a first direction D[m] whose assigned A[m] indicates the highest likelihood of an edge crossing said pixel position along said D[m];

performing a segment analysis on a symmetric segment pair seg[m,x] and seg[m,y] associated with D[m], said segment analysis adapted to verify said symmetric segment pair as belonging to an edge crossing said pixel position, said seg[m,x] and seg[m,y] symmetrically located with respect to said pixel position;

in response to said D[m] having been verified by said segment analysis, performing spatial interpolation at said pixel position along said D[m];

performing a cross check test to verify that for a second direction whose slope is vertical or is of opposite sign from the slope of D[m] an absolute difference between A[h] and A[m] is less than a pre-defined threshold, and wherein D[m] is disqualified as an interpolation direction for said pixel position if said absolute is not less than said threshold; and performing post processing by adjusting the interpolated value of said pixel position according to the interpolated value of said pixel position and the pixel values of pixels neighboring said pixel position.

17. For an image to be re-sampled, a system of performing spatial interpolation at a pixel position of a resampling line, said pixel position immediately below pixel x[0] of a first line comprising pixels x[−n] to y[n], said pixel position also immediately above pixel y[0] of a second line comprising y[−n] to y[n], said system comprising:

an evaluation unit adapted for assigning for k=0 to 2n a numerical value A[k] to a direction D[k] that is established as a possible interpolation direction intercepting x[−n+k], said pixel position, and y[n−k], wherein said A[k] is defined for indicating the likelihood of an edge crossing said pixel position along said D[k] by quantifying the degree of similarity between pixel segments seg[k,x]={x[−n+k−c], ..., x[−n+k+c]} and seg[k,y]={y[n−k−c], ..., y[n−k+c]};

a selection unit coupled to said evaluation unit, said selection unit adapted for selecting from D[0] to D[2n] a first direction D[m,] whose assigned A[m] indicates the highest likelihood of an edge crossing said pixel position along said D[m];

a segment analysis unit coupled to said selection unit, said segment analysis unit adapted to performing a segment analysis on a symmetric segment pair seg[m,x] and seg[m,y] associated with D[m] to verify that the microstructure of said seg[m,x] and seg[m,y] is consistent with features of an edge, said seg[m,x] and seg[m,y] symmetrically located with respect to said pixel position; and an interpolation unit adapted for performing spatial interpolation at said pixel position along said D[m] in response to said D[m] having been verified by said segment analysis unit;

wherein for k=0 to 2n, said A[k]=$\Sigma_{r=-c \text{ to } c} f(P(x[-n+k+r]), P(y[n-k+r]))$; and wherein said function P is adapted to assign a pixel value to every pixel.

18. The system of claim 17, wherein said segment analysis unit comprises:

a peak/valley count test unit to perform a peak/valley count test to verify that the total number of peaks and valleys in a graph graph[m,x] assigned to D[m] does not exceed 1, and that the total number of peaks and valleys in the graph graph[m,y] assigned to D[m] does not exceed 1, wherein said graph[m,x] comprises {x[u], P(x[u]) for u=(−n+m)+(−n+m) to 0}, and wherein said graph [m,y] comprises {y[v], P(y[v]); for v=0 to (n−m)+(n−m)}.

19. The system of claim 17, wherein said segment analysis unit comprises:

a pixel value difference test unit adapted for performing a pixel value difference test to verify that none of said 2c+1 summands {f(P(x[−n+m+r]), P(y[n−m+r]); r=−c to c} of A[m] of exceeds a pre-defined threshold value.

20. The system of claim 17, wherein said segment analysis unit comprises:

a peak/valley count test unit adapted for performing a peak/valley count test to verify that the total number of peaks and valleys in a graph graph[m,y] assigned to D[m] does not exceed 1, and that the total number of peaks and valleys in a graph graph[m,y] assigned to D[m] does not exceed 1, wherein said wherein said graph [m,x] comprises {x[u], P(x[u]); for u=(−n+k)+(−n+k) to 0}; and wherein said graph[m,y] comprises {y[v], P(y[v]); for v=0 to (n−k)+(n−k)}; and a pixel value difference test unit adapted for performing a pixel value difference test to verify that none of said 2c+1 summands {f(P(x[−n+m+r]), P(y[n−m+r]); r=−c to c} of A[m] exceeds a pre-defined threshold value.

21. The system of claim 17, wherein for k=0 to 2n, said $A[k]=\Sigma_{r=-c\ to\ c}|P(x[-n+k+r])-P(y[n-k+r])|$ is proportional to the expectation of said function P as a random variable function; and wherein said A[m] is the smallest element of {A[0], A[1], . . . A[2n]}.

22. The system of claim 17, wherein for k=0 to 2n, said $A[k]=\Sigma_{r=-c\ to\ c}|P(x[-n+k+r])-P(y[n-k+r])|^2$ is proportional to the variance of said function P as a random variable function; and wherein said A[m] is the smallest element of {A[0], A[1], . . . A[2n]}.

23. The system of claim 17, wherein for k=0 to 2n, said $A[k]=\Sigma_{r=-c\ to\ c}1/(|P(x[-n+k+r])*P(y[n-k+r])|)$ is proportional to the cross correlation of said function P as a random variable function; and wherein said A[m] is the smallest element of {A[0], A[1], . . . A[2n]}.

24. The system of claim 17, wherein said interpolation unit is adapted for performing spatial interpolation at said pixel position along a default interpolation direction in response to said D[m] having failed said verification by said segment analysis unit.

25. The system of claim 24, wherein said default interpolation direction intercepts said pixel position, thereby forming approximately a 45-degree angle at said resampling pixel.

26. The system of claim 17, wherein said segment analysis unit comprises:

a pixel value difference test unit adapted to verify that none of said 2c+1 summands {f(P(x[−n+m+r]), P(y[n−m+r]); r=−c to c} of A[m] exceeds a pre-defined threshold value.

27. The system of claim 17, wherein said segment analysis unit comprises:

a peak/valley count test unit adapted to verify that the total number of peaks and valleys in a graph graph graph [m,x] assigned to D[m] does not exceed 1, and that the total number of peaks and valleys in a graph graph[m,y] assigned to D[m] assigned to does not exceed 1, wherein said graph[m,x] comprises {x[u], P(x[u]); for u=(−n+k)+(−n+k) to 0}, and wherein said graph [m,y] comprises {y[v], P(y[v]); for v=0 to (n−k)+(n−k)}; and a pixel value difference test unit adapted to verify that none of said 2c+1 summands {f(P(x[−n+m+r]), P(y[n−m+r]); r=−c to c} of A[m] exceeds a pre-defined threshold value.

28. The system of claim 17 further comprising:

an extreme value analysis unit 333 is adapted to detect in a graph of A[t] as t varies continuously from 0 to 8 a first case wherein said A[m] is a minimum with m is not equal to 0 or 8 and the slope of A[t] changes sign only once from negative to positive; a second case wherein said A[m] is a minimum with m equals to 0 and the sign of slope of A[t] remains positive; or a third case wherein said A[m] is a minimum with m equals to 8 and the sign of slope of A[t] remains negative; and wherein D[m] is disqualified if does not fit any one of said three cases.

29. The system of claim 17, further comprising:

a post processing unit adapted for performing post processing by adjusting the interpolated value of said pixel position according to the interpolated value of said pixel position and the pixel values of pixels neighboring said pixel position.

30. For an image to be re-sampled, a system of performing spatial interpolation at a pixel position of a resampling line, said pixel position immediately below pixel x[0] of a first line comprising pixels x[−n] to y[n], said pixel position also immediately above pixel y[0] of a second line comprising y[−n] to y[n], said system comprising:

an evaluation unit adapted for assigning for k=0 to 2n a numerical value A[k] to a direction D[k] that is established as a possible interpolation direction intercepting x[−n+k], said pixel position, and y[n−k], wherein said A[k] is defined for indicating the likelihood of an edge crossing said pixel position along said D[k] by quantifying the degree of similarity between pixel segments seg[k,x]={x[−n+k−c], . . . , x[−n+k+c]} and seg[k,y]={y[n−k−c], . . . , y[n−k+c]};

a selection unit coupled to said evaluation unit, said selection unit adapted for selecting from D[0] to D[2*n*] a first direction D[m,] whose assigned A[m] indicates the highest likelihood of an edge crossing said pixel position along said D[m];

a segment analysis unit coupled to said selection unit, said segment analysis unit adapted to performing a segment analysis on a symmetric segment pair seg[m,x] and seg[m,y] associated with D[m] to verify that the microstructure of said seg[m,x] and seg[m,y] is consistent with features of an edge, said seg[m,x] and seg[m,y] symmetrically located with respect to said pixel position; and an interpolation unit adapted for performing spatial interpolation at said pixel position along said D[m] in response to said D[m] having been verified by said segment analysis unit;

wherein for k=0 to 2n, said $A[k]=J(g(x[i]), g(y[j]))$, i=−n+k−c to −n+k+c, and j= n−k−c to n−k+c, wherein functions J and g can be chosen in accordance with the application at hand.

31. The method of claim 30, wherein said function g is the Fourier transform of P acting on pixels belonging to the segment pair seg[k,x] and seg[k,y] associated with D[k] for k=0 to 2n.

32. The method of claim 30, wherein said function g is the wavelet transform of P acting on pixels belonging to the symmetric segment pair seg[k,x] and seg[k,y] associated with D[k] for k=0 to 2n.

33. The method of claim 30, wherein for motion pictures, said function g(x[i])=q(P(x[i]), motion_data(x[i])) acting at a pixel x[i] is equal to a combination q of pixel value P acting at said pixel x[i] and the motion data information at said pixel x[i] to the symmetric segment pair associated with D[k], for k=0 to 2n.

34. The system in any of claims 21–30, wherein said 2n=8, wherein said c=3, and wherein said pixel value assigned by P is luminance value.

35. For an image to be re-sampled, a system of performing spatial interpolation at a pixel position of a resampling line, said pixel position immediately below pixel x[0] of a first line comprising pixels x[−n] to y[n], said pixel position also immediately above pixel y[0] of a second line comprising y[−n] to y[n], said system comprising:

an evaluation unit adapted for assigning for k=0 to 2n a numerical value A[k] to a direction D[k] that is established as a possible interpolation direction intercepting x[−n+k], said pixel position, and y[n−k], wherein said A[k] is defined for indicating the likelihood of an edge crossing said pixel position along said D[k] by quantifying the degree of similarity between pixel segments seg[k,x]={x[−n+k−c], . . . , x[−n+k+c]} and seg[k,y]={y[n−k−c], . . . , y[n−k+c])};

a selection unit coupled to said evaluation unit, said selection unit adapted for selecting from D[0] to D[2n] a first direction D[m,] whose assigned A[m] indicates the highest likelihood of an edge crossing said pixel position along said D[m];

a segment analysis unit coupled to said selection unit, said segment analysis unit adapted to performing a segment analysis on a symmetric segment pair seg[m,x] and seg[m,y] associated with D[m] to verify that the microstructure of said seg[m,x] and seg[m,y] is consistent with features of an edge, said seg[m,x] and seg[m,y] symmetrically located with respect to said pixel position; and an interpolation unit adapted for performing spatial interpolation at said pixel position along said D[m] in response to said D[m] having been verified by said segment analysis unit;

a cross check test unit adapted for performing a cross check test to verify that for a second direction D[h] whose slope is vertical or is of opposite sign from the slope of D[m] an absolute difference between and is less than a pre-defined threshold, and wherein D[m] is disqualified as an interpolation direction for said pixel position if said absolute difference is not less than said pre-defined threshold.

36. For an image to be re-sampled, a system of performing spatial interpolation at a pixel position of a resampling line, said pixel position immediately below pixel x[0] of a first line comprising pixels x[−n] to y[n], said pixel position also immediately above pixel y[0] of a second line comprising y[−n] to y[n], said system comprising:

an evaluation unit adapted for assigning for k=0 to 2n a numerical value A[k] to a direction D[k] that is established as a possible interpolation direction intercepting x[−n+k], said pixel position, and y[n−k], wherein said A[k] is defined for indicating the likelihood of an edge crossing said pixel position along said D[k] by quantifying the degree of similarity between pixel segments seg[k,x]={x[−n+k−c], ..., x[−n+k+c]} and seg[k,y]={y[n−k−c], ..., y[n−k+c])};

a selection unit coupled to said evaluation unit, said selection unit adapted for selecting from D[0] to D[2n] a first direction D[m,] whose assigned A[m] indicates the highest likelihood of an edge crossing said pixel position along said D[m];

a segment analysis unit coupled to said selection unit, said segment analysis unit adapted to performing a segment analysis on a symmetric segment pair seg[m,x] and seg[m,y] associated with D[m] to verify that the microstructure of said seg[m,x] and seg[m,y] is consistent with features of an edge, said seg[m,x] and seg[m,y] symmetrically located with respect to said pixel position; and an interpolation unit adapted for performing spatial interpolation at said pixel position along said D[m] in response to said D[m] having been verified by said segment analysis unit;

wherein said segment analysis unit comprises a peak/valley count test unit adapted to verify that the total number of peaks and valleys in a graph graph graph [m,x] assigned to D[m] does not exceed 1, and that the total number of peaks and valleys in the graph graph [m,y] assigned to D[m] assigned to does not exceed 1, wherein said graph[m,x] comprises {x[u], P(x[u]); for u=(−n+k)+(−n+k) to 0}, and wherein said graph [m,y] comprises {y[v], P(y[v]); for v=0 to (n−k)+(n−k)}.

37. A method for re-sample an image by spatial interpolation, said method comprising the steps of:

assigning n numerical value respectively to n pre-defined interpolation directions that intercept effectively at a pixel position in a resampling line, forming respectively n non-zero angles with said resampling line;

selecting an interpolation direction from said n interpolation directions by ranking said n assigned numerical values;

eliminating erroneous selection of selected interpolation direction by performing a plurality of verification tests on said selected interpolation direction; and in response to the selected interpolation direction passing all verifications, performing spatial interpolation along said selected interpolation direction;

wherein said selected interpolation direction fails a first test of said plurality of verification tests if multiple edges are found crossing at said pixel position;

wherein said selected interpolation direction fails a second test of said plurality of said verification tests if the number of peaks and valleys is greater than one and wherein said selected interpolation direction fails a third test of said plurality of verification tests if any of a plurality of summands adapted to define said assigned value of said selected interpolation direction exceeds a pre-defined threshold value.

* * * * *

UNITED STATES PATENT AND TRADEMARK OFFICE
CERTIFICATE OF CORRECTION

PATENT NO. : 6,965,705 B1  
APPLICATION NO. : 09/925195  
DATED : November 15, 2005  
INVENTOR(S) : Ma et al.

Page 1 of 1

It is certified that error appears in the above-identified patent and that said Letters Patent is hereby corrected as shown below:

At column 13, line 18, replace "1(1P(x[-n+k+r])" with --1/(1P(x[-n+k+r])--
At column 13, line 38, replace "(n-k)+(n-k} and" with --(n-k)+(n-k}; and--

Signed and Sealed this

Ninth Day of January, 2007

JON W. DUDAS
*Director of the United States Patent and Trademark Office*